United States Patent
Schulz et al.

[11] Patent Number: 6,143,269
[45] Date of Patent: Nov. 7, 2000

[54] PURIFICATION OF SULFURYL FLUORIDE

[75] Inventors: Alf Schulz, Wedemark; Matthias Rieland, Hannover; Lothar Zipfel, Laatzen; Thomas Born, Holle; Eckhard Hausmann, Hannover, all of Germany

[73] Assignee: Solvay Fluor und Derivate GmbH, Hannover, Germany

[21] Appl. No.: 09/362,749

[22] Filed: Jul. 29, 1999

[30] Foreign Application Priority Data

Aug. 1, 1998 [DE] Germany ............... 198 34 882

[51] Int. Cl.⁷ .................................. C01B 17/46
[52] U.S. Cl. .......................... 423/468; 423/467
[58] Field of Search .................. 423/467, 468; 252/186.43; 424/703

[56] References Cited

U.S. PATENT DOCUMENTS

| | | | |
|---|---|---|---|
| 2,875,127 | 2/1959 | Kenaga . | |
| 3,132,925 | 5/1964 | Pacini et al. | 423/468 |
| 3,320,030 | 5/1967 | Bisignani et al. . | |
| 3,403,144 | 9/1968 | Lam et al. | 423/468 |
| 3,850,542 | 11/1974 | Barnard et al. | 423/468 |
| 3,996,029 | 12/1976 | Gustafson et al. | 55/77 |
| 4,003,987 | 1/1977 | Jones et al. | 423/468 |
| 4,082,839 | 4/1978 | Eibeck et al. | 423/489 |
| 4,102,987 | 7/1978 | Cook et al. | 423/466 |
| 4,465,655 | 8/1984 | Geisier et al. | 423/240 |
| 4,950,464 | 8/1990 | Fujoka et al. | 423/468 |

FOREIGN PATENT DOCUMENTS

| | | |
|---|---|---|
| 1208296 | 1/1966 | Germany . |
| 43 43 689 | 10/1994 | Germany . |
| 44 41 628 | 5/1996 | Germany . |
| 196 21 516 | 12/1997 | Germany . |
| 727062 | 3/1955 | United Kingdom . |

OTHER PUBLICATIONS

CA:122:25907 abs of DE4343689, Oct. 1994.
CA:125: 32850 abs of DE4441628, Nov. 1994.

*Primary Examiner*—Jean F Vollano
*Attorney, Agent, or Firm*—Evenson, McKeown, Edwards & Lenahan, P.L.L.C.

[57] ABSTRACT

Sulfuryl fluoride ($SO_2F_2$) frequently contains chlorine, sulfur dioxide and other acidic impurities owing to its production. Effective purification is possible if the sulfuryl fluoride is contacted with hydrogen peroxide or a precursor thereof, preferably in an aqueous solution. The purified product is suitable as a pesticidal agent, for example.

6 Claims, No Drawings

PURIFICATION OF SULFURYL FLUORIDE

BACKGROUND AND OF THE INVENTION

This application claims the priority of German patent application 198 34 882.7, filed on Aug. 1, 1998, the disclosure of which is expressly incorporated by reference herein.

The present invention relates to the purification of sulfuryl fluoride.

Sulfuryl fluoride ($SO_2F_2$) can be used as a pesticide (fumigant). It is prepared, for example, by reacting sulfur dioxide, chlorine or sulfuryl chloride and hydrogen fluoride over a catalyst, for example an alkali bifluoride on activated carbon. See DE-B 1 208 296. The crude product, which still contains hydrogen fluoride, hydrogen chloride, sulfur dioxide, chlorine and sulfuryl chlorofluoride, is purified by means of water in two scrubbers connected in series.

It is an object of the present invention to devise a process with which sulfuryl fluoride can be purified more effectively.

SUMMARY OF THE INVENTION

This object is achieved by the process according to the invention, which provides for sulfuryl fluoride to be purified by contacting with hydrogen peroxide or a precursor thereof.

"Precursors of hydrogen peroxide" are understood to be those compounds which release hydrogen peroxide, in particular in the form of an aqueous solution. Precursors that do not react too basically (risk of decomposition of the $SO_2F_2$) can also be used, for example perborates or percarbonates, e.g., as sodium salts. Preferably contacting is effected with hydrogen peroxide, which is expediently in the form of an aqueous solution.

DETAILED DESCRIPTION OF THE INVENTION

The concentration of hydrogen peroxide or of the precursor thereof is advantageously in the range of 0.1 to 10% by weight of the aqueous solution.

The contacting of the sulfuryl fluoride to be purified with the purification solution is expediently effected in a temperature range of 0 to 40° C.

The purification process according to the present invention can be performed immediately following the preparation of $SO_2F_2$. Alternatively, the purification process according to the present invention can be performed in time-related conjunction with the application or use of $SO_2F_2$. For example, $SO_2F_2$ which has not yet been purified or has only been partially purified can be purified according to the invention immediately before application, e.g. as a pesticide. Of course, the purification process according to the present invention can also be performed sometime between the preparation and application of the $SO_2F_2$.

The process according to the present invention can be used particularly for the purification of sulfuryl fluoride which contains chlorine, fluorine and/or sulfur dioxide. It is also effective if acids such as hydrofluoric acid or hydrochloric acid are additionally contained therein.

The advantage of the process according to the present invention is, inter alia, that the purification can be performed rapidly and effectively. The sulfuryl fluoride is not attacked in so doing.

The sulfuryl fluoride prepared according to the present invention is substantially free of sulfur dioxide and chlorine, and can therefore be used particularly well as a pesticide. No additional purification is necessary before use. Owing to its purity, no harmful effects on sensitive materials need be feared when it is used.

The following example is intended to explain the invention further, without restricting its scope.

EXAMPLE

Purification of $SO_2F_2$ with $H_2O_2$

Crude $SO_2F_2$ gas containing 0.5% $SO_2$ (percent surface when measured by gas chromatography) was passed at ambient temperature through a scrubber which contained an aqueous $H_2O_2$ solution ($H_2O_2$ concentration: 8% by weight). The $SO_2F_2$ leaving the scrubber contained less than 0.05% $SO_2$ (measured using gas chromatography).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for the preparation of purified sulfuryl fluoride, comprising contacting impure sulfuryl fluoride with hydrogen peroxide or a precursor thereof, thereby obtaining purified sulfuryl fluoride.

2. A process according to claim 1, wherein said hydrogen peroxide or precursor thereof is in an aqueous solution.

3. A process according to claim 2, wherein said aqueous solution contains said hydrogen peroxide or precursor thereof at a concentration in the range of 0.1 to 10% by weight.

4. A process according to claim 1, wherein said contacting is carried out at a temperature of 0 to +40° C.

5. A process according to claim 1, wherein said impure sulfuryl fluoride contains at least one impurity selected from the group consisting of sulfur dioxide, elemental fluorine, and chlorine.

6. A process according to claim 5, wherein said impure sulfuryl fluoride further contains as additional impurity at least one of HF and HCl.

* * * * *